A. L. GOODKNIGHT.
AIR BRAKE ADJUSTING DEVICE FOR LOADED AND EMPTY CARS.
APPLICATION FILED FEB. 19, 1909.
943,778.
Patented Dec. 21, 1909.
2 SHEETS—SHEET 2.
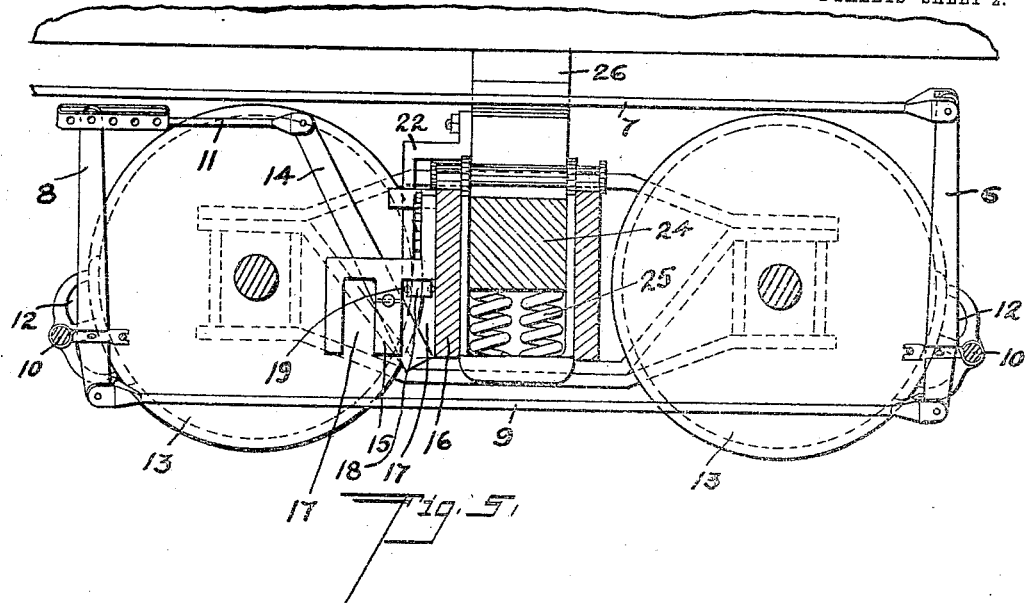
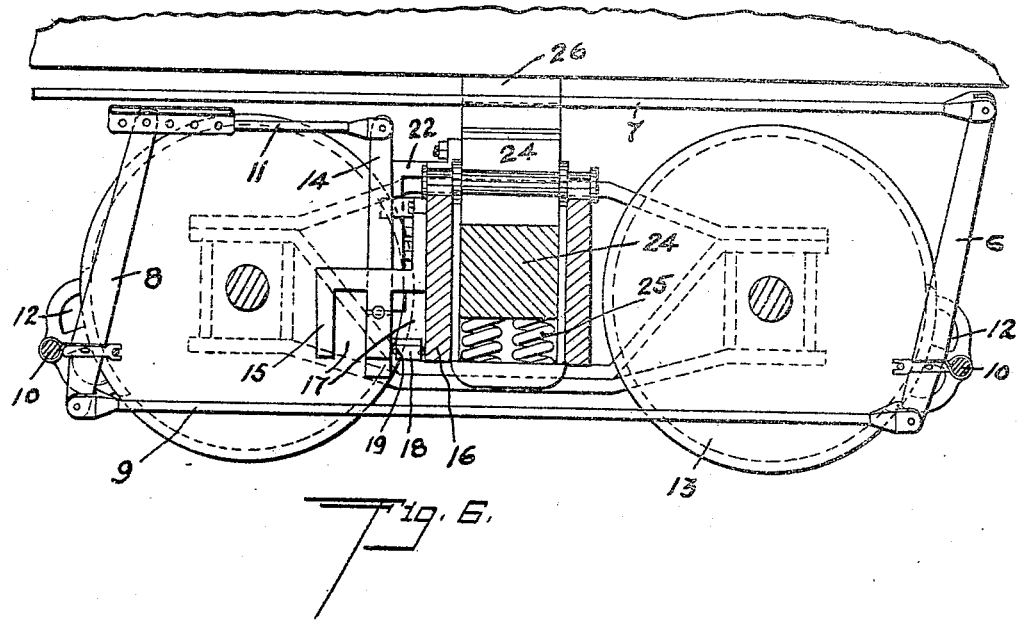
Alva L. Goodknight, Inventor.
Witnesses:
Roy G. Kratz
H. J. Cathro
By David O. Barnell,
Attorney.

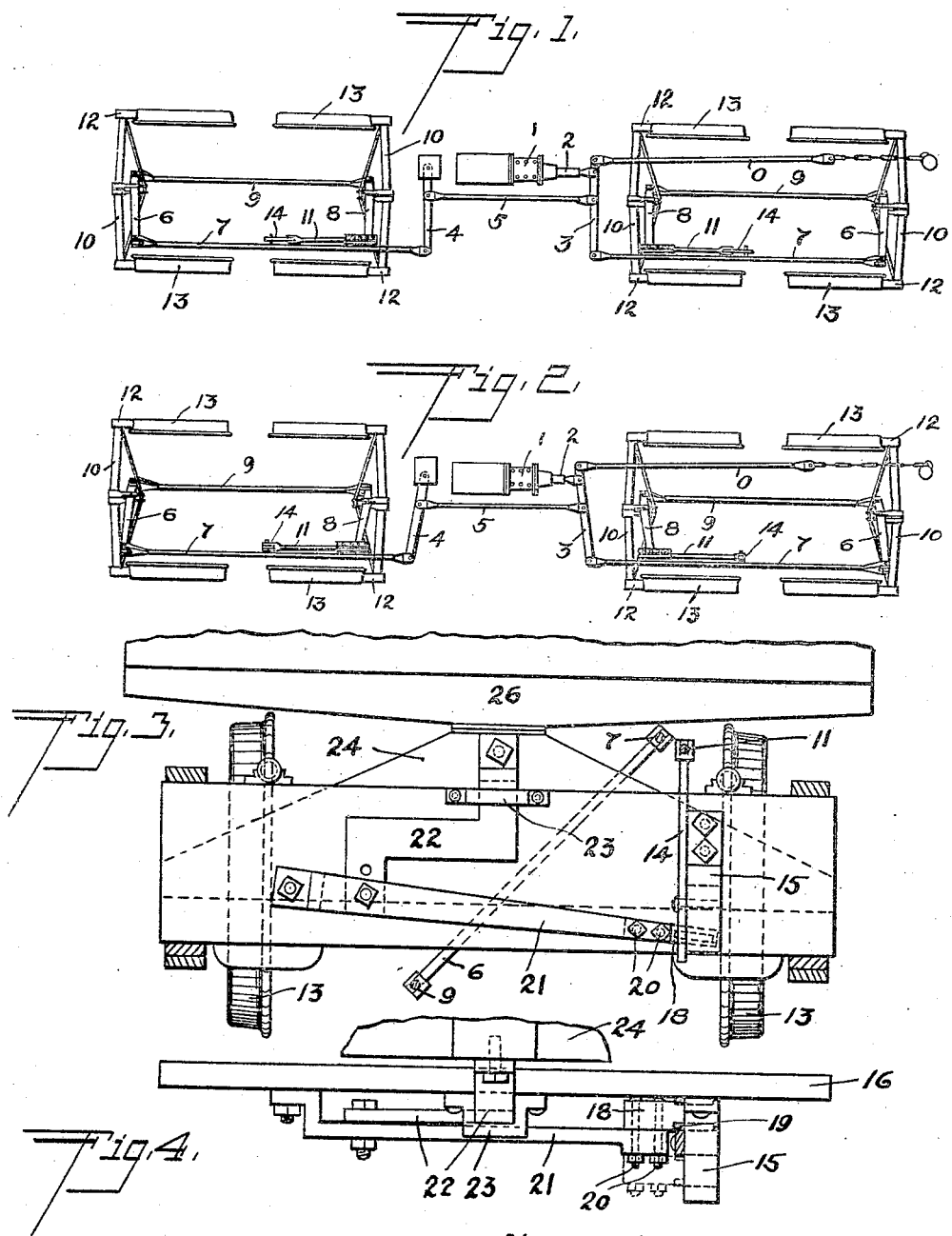

UNITED STATES PATENT OFFICE.

ALVA L. GOODKNIGHT, OF MENA, ARKANSAS.

AIR-BRAKE-ADJUSTING DEVICE FOR LOADED AND EMPTY CARS.

943,778.

Specification of Letters Patent. Patented Dec. 21, 1909.

Application filed February 19, 1909. Serial No. 478,993.

*To all whom it may concern:*

Be it known that I, ALVA L. GOODKNIGHT, a citizen of the United States, residing at Mena, in the county of Polk and State of Arkansas, have invented certain new and useful Improvements in Air-Brake-Adjusting Devices for Loaded and Empty Cars, of which the following is a specification.

My invention relates to automatic-air-brake mechanism for railway cars and it is the object thereof to provide an automatically operated means for securing greater braking-power on loaded cars than on empty ones.

In automatic-air-brakes as ordinarily arranged the brakes are adjusted so as to secure a certain percentage (in ordinary freight cars about 70%) of the maximum braking-power obtainable when the car is empty. The maximum braking power of a car is that obtained when the pressure of the brake-shoes upon the wheels is just below that sufficient to lock the wheels and cause them to slide upon the rails, and, in practice, this pressure should never be exceeded. Other things being equal, the maximum braking power of a car is proportional to the load carried upon the wheels and, of course, is greater on loaded cars than on the same cars when empty. As the momentum of a moving car is proportional to its weight, it follows that the actual braking power, or the pressure of the brake-shoes upon the wheels, should be varied proportionally to the total weight, or, in other words, that the percentage obtained of the maximum braking power should be the same whether the car is empty or loaded. For example, a car weighing 30,000 pounds is loaded with a weight of 30,000 pounds, making the total weight on the wheels 60,000 pounds. If the brakes were adjusted on the car when empty so as to obtain 70% of the maximum braking power, then when the car was loaded the braking power would be only 35% of the maximum, and as the momentum of the moving car is proportional to the weight thereof, the loaded car would be far more difficult to stop than the empty car.

To show the effect in the operation of a train of cars having varying percentages of braking power, consider the case of a train consisting partly of loaded cars and partly of empty ones, in which all the cars have the same percentages of braking power when empty. If the loaded cars are near the rear end of the train, when the brakes are applied the empty cars, having the higher percentage of braking power and tending to stop more quickly than the loaded cars, will be pushed forward by the loaded cars, and a sufficient application of the brakes to stop the train quickly will often result in over-braking of the empty cars with consequent flattening of the wheels thereof resulting from sliding the same upon the rails. In case the loaded cars were at the head of the train and the empty cars behind them, application of the brakes will cause the empty cars to hold back on the loaded cars and, in practice, such action frequently results in breaking the train in two, with consequent damage to the draft-rigging of one or more of the cars. Theoretically then, if a car is doubled in weight by loading the same, the actual braking power, or the pressure of the brake-shoes upon the wheels, should be doubled in order that the braking power may be proportional to the momentum of the car and the loaded car stopped with the same facility as the empty one.

In air-brakes controlled by the ordinary types of triple-valves, the brake-cylinder-pressure, and consequently the pressures of the brake-shoes upon the wheels, is proportional to the travel of the brake-piston, since the movement of the triple-valve is controlled by the relation of train-pipe-pressure and auxiliary-reservoir-pressure. Thus a certain reduction of train-pipe-pressure will actuate the triple-valve and admit a quantity of air to the brake-cylinder sufficient to cause a reduction of pressure in the auxiliary reservoir corresponding to the reduction of train-pipe-pressure. The quantity of air admitted to the brake-cylinder is substantially the same whether the piston travel is long or short, since the admission of air thereto is stopped by the triple-valve as soon as the auxiliary-reservoir-pressure is reduced by an amount proportional to the reduction of train-pipe-pressure. It follows that if the piston travel is short the air admitted to the brake-cylinder will have only a limited space in which to expand and consequently will be at a higher pressure than if the piston travel were longer and a larger space formed thereby in the brake-cylinder in which the air admitted thereto might expand.

The piston travel is determined by the amount of slack in the brake connections, or the distance from the wheels to the brake-shoes when in release position, assuming that there are no loose joints or lost motion in the connections between the brake-cylinder and brake-shoes.

From the foregoing it will be obvious that by providing means automatically varied by the loading of the car, for changing the travel of the brake-piston, or rather for changing the amount of slack in the brake connections, the braking power of a car may be automatically varied to correspond with the loading of the car.

My invention provides such a means for varying the braking power of a car, and constructions embodying my invention are illustrated in the accompanying drawings, in which—

Figure 1 is a diagrammatic plan view of the brake connections of a car in the positions assumed on an empty car when my adjusting device is used in connection therewith, Fig. 2 is a similar view showing the positions of the connections when the car is loaded, Fig. 3 is a transverse vertical section of one of the car-trucks, showing my mechanism thereon, Fig. 4 is a detail plan view of a portion of the same, Fig. 5 is a longitudinal vertical section of the truck, showing the position of the fulcrum-adjusting lever on an empty car, and Fig. 6 is a similar view showing the position of said lever on a loaded car.

Referring to Figs. 1 and 2, the parts of an ordinary system of brake connections are shown in the positions assumed thereby when the brakes are applied, in the first figure as adjusted by my mechanism on an empty car, and in the second figure as automatically adjusted on a loaded car. As the function and operation of the parts will be understood by those skilled in the art, I will merely enumerate the different parts shown and indicate the same by reference numerals, as follows: The brake-cylinder 1, the piston-rod 2, the cylinder-lever 3, the hand-brake rod 0, the floating-lever 4, the floating-lever connecting-rod 5, the live-levers 6, the live-lever connecting-rods 7, the dead-levers 8, the dead-lever connecting-rods 9, the brake-beams 10, the dead-lever fulcrum-rods 11, the brake-shoes 12, and the wheels 13. In all ordinary systems of brake connections the dead-lever fulcrum-rods are connected directly with the truck-frame, and adjustments of the dead-lever fulcrum are made, to change the slack of the brake-connections and to compensate wear of the brake shoes, by connecting the end of the dead-lever with different ones of a series of holes in the free end of the fulcrum-rod.

In carrying out my invention, instead of connecting the dead-lever fulcrum-rod directly to the truck-frame, I connect the same with the adjusting-lever 14 which is fulcrumed on a bracket 15 and is adapted to swing on said fulcrum from the position shown in Fig. 5 to the position shown in Fig. 6. The bracket 15 is secured to one of the transoms 16 of the truck-frame, and has two vertically-extending guide-slots 17 formed therein, one on each side of the fulcrum of the adjusting-lever 14, as shown in said Figs. 5 and 6. A block or head 18, provided with rollers 19 at the sides thereof, is arranged in one of the guide-slots in the bracket. The said head is connected by means of bolts 20 to the end of the transom-lever 21 which is fulcrumed on the transom 16 near the end thereof opposite the bracket 15. The said lever and bracket are so arranged longitudinally of the truck that by reversing the position of the head 18, as shown by dotted lines in Fig. 4, the same may be placed in either of the guide-slots 17 and connected with the transom-lever 21 on the front or rear side thereof by said bolts 20. Near the fulcrum of the transom-lever 21 the depressing-bar 22 is connected therewith. The said bar extends upwardly through a guide-bracket 23 carried by the transom 16, and is connected with the bolster 24 which rests on the springs 25 and supports the body-transom 26.

When the car is loaded, the truck-springs 25 are compressed and the bolster 24 moves downwardly relatively to the rest of the truck-frame. This movement of the bolster 24, being communicated to the transom-lever 21 through the depressing-bar 22, moves said lever 21 and the head 18 down to the positions shown in Figs. 3 and 6. The downward movement of the head 18 actuates the lever 14, throwing the same to a substantially vertical position, as shown in Fig. 6, and said movement of the adjusting-lever, by changing the fulcrum of the dead-lever, reduces the slack of the brake connections, bringing the brake-shoes closer to the wheels, so that when the brakes are applied the piston-travel necessary to make such application is relatively short, as indicated in Fig. 2.

When the load is removed from the car and the truck-springs expand and raise the bolster 24 relatively to the transoms, the head 18 is raised to the upper end of the guide-slot 17, and the adjusting-lever is thereby permitted to move over to the diagonal position shown in Fig. 5, thus increasing the amount of slack in the brake connections so that a longer piston-travel is necessary to apply the same, as indicated in Fig. 1.

The lever 21 is employed in connecting the head 18 with the bolster 24, for the purpose of increasing the amount of movement obtained directly from the compression of the truck-springs by the loading of the car. From Fig. 6 it may be seen that after the adjusting-lever 14 is raised to the vertical position by movement of the head 18 to a position below the fulcrum of said adjusting-lever, the said head may have a considerable vertical movement in the guide-slot 17 without permitting the adjusting-lever to change from the vertical position. This additional vertical movement is allowed to the head to compensate for the variations in the compression of the truck-springs resulting from jolting over rough tracks and the like, so that such variations of the spring compression will not alter the adjustment of the brakes.

The head 18 is made reversible with respect to the transom-lever 21, and the extra guide-slot 17 provided in the bracket 15 adjacent to the fulcrum of the adjusting-lever, in order to enable the same devices to be used for any system of brake connections in which it might be necessary, in order to increase and decrease the slack of the connections, to move the dead-lever fulcrum in directions opposite to those necessary in the system of connections shown.

Now, having described my invention, what I claim and desire to secure by Letters Patent is:

1. In an automatic-air-brake mechanism for railway cars, the combination with a rod-and-lever system connecting the brake-cylinder and brake-shoes, of means connected with said rod-and-lever system and automatically operated by compression and expansion of the truck-springs for varying the relation of the brake-shoes and the wheels of the car, the said varying means operating to retain the brake-shoes close to the wheels when the truck-springs are compressed beyond a predetermined amount and to leave the brake-shoes more distant from the wheels when the truck-springs are not compressed beyond said predetermined amount.

2. In an automatic-air-brake mechanism for railway cars, the combination with the means for connecting the brake-cylinder and brake-shoes, of a lever connected with said connecting means, said lever being arranged so that movement thereof will vary the relation of the brake-shoes and the wheels of the car, and means for automatically actuating said lever by the compression and expansion of the car-truck springs, the said actuating means operating the lever to retain the brake-shoes close to the wheels when the car-truck springs are compressed beyond a predetermined amount and to leave the brake-shoes more distant from the wheels when said springs are not compressed beyond said predetermined amount.

3. In an automatic-air-brake mechanism for railway cars, the combination with the means connecting the brake-cylinder and brake-shoes, of a lever arranged with said connecting means so that movement of said lever will vary the relation of the brake-shoes and the wheels of the car, and means for actuating said lever, said actuating means being controlled by relative movement of the truck-bolster and transom and operating to retain the brake-shoes close to the wheels when the truck-bolster is depressed beyond a predetermined amount and to leave the brake-shoes more distant from the wheels when the truck-bolster is not depressed beyond said predetermined amount.

4. In an automatic-air-brake mechanism for railway cars, the combination with the mechanism connecting the brake-cylinder and brake-shoes, of a lever arranged with said connecting mechanism so that by movement of said lever the brake-piston-travel necessary to apply the brakes will be varied, and means automatically controlled by the loading of the car for actuating said lever, said means operating to require a short brake-piston-travel when the car is loaded beyond a predetermined amount and to permit a longer brake-piston-travel when the car is not loaded beyond said predetermined amount.

5. In an automatic-air-brake mechanism for railway cars, the combination with the mechanism for connecting the brake-cylinder and brake-shoes, of a lever arranged with said connecting mechanism so that by movement of the said lever the slack between the brake-shoes and car wheels may be varied, and means controlled by the loading of the car for actuating said lever, the said actuating means operating to cause a minimum amount of slack when the car is loaded beyond a certain minimum and to permit an increased slack when the car is not loaded beyond said minimum.

6. In a railway car, an automatic-air-brake mechanism comprising the combination with a brake-cylinder, brake-shoes, and mechanism connecting the same, of a means arranged in said connecting mechanism and by movement of which the slack between the brake-shoes and the car wheels may be varied, and means automatically controlled by the loading of the car for actuating said slack-varying means, the said actuating means operating to cause a minimum amount of slack when the car is loaded beyond a certain minimum and to permit an increased slack when the car is not loaded beyond said minimum.

7. In an automatic-air-brake mechanism for railway cars, the combination with mechanism for connecting the brake-cylinder and brake-shoes, of a lever connected with said connecting mechanism and movable to two positions in one of which the connecting mechanism is caused to hold the brake-shoes close to the wheels and in the other to hold the brake-shoes more distant therefrom, and means for moving the lever to and retaining the same in the first position when the car is loaded.

8. In a railway car, an automatic-air-brake mechanism comprising the combination with the brake-cylinder, brake-shoes and mechanism connecting the same, of a lever arranged with said connecting mechanism and by movement of which the slack between the brake-shoes and car wheels may be varied, and means for actuating said lever comprising a head movable adjacent to said slack-varying lever, a lever connected with said head and fulcrumed on the car-truck transom, and a bar connected with said transom-lever and with the truck-bolster, whereby relative movement of the bolster and transom will actuate the head.

9. In an automatic-air-brake mechanism for railway cars, the combination with the car-truck, brake-cylinder, brake-beams, and equalizing rod-and-lever connections between the brake-cylinder and brake-beams, including a dead-lever connected with one of the brake-beams, of an adjusting-lever connected with the dead-lever fulcrum-rod, and means controlled by compression and expansion of the truck-springs for actuating said adjusting-lever to vary the dead-lever fulcrum.

10. In an automatic-air-brake mechanism for railway cars, the combination with the car-truck, brake-cylinder, brake-beams, and equalizing rod-and-lever connections between the brake-cylinder and brake-beams, including a dead-lever connected with one of the brake-beams, of an adjusting-lever connected with the dead-lever fulcrum so that by movement of said lever the dead-lever fulcrum may be varied, and means for actuating said adjusting-lever, said actuating means being controlled by the loading of the car.

11. In an automatic-air-brake mechanism for railway cars, the combination with the car-truck, brake-cylinder, brake-beams, and equalizing rod-and-lever connections between the brake-cylinder and brake-beams, including a dead-lever connected with one of the brake-beams, of an adjusting-lever connected with the dead-lever fulcrum so that by movement of said adjusting-lever the dead-lever fulcrum may be varied, a head movable adjacent to the said adjusting-lever for actuating the same, a lever fulcrumed on the car-truck transom and carrying said head, and a bar connected with said transom-lever and with the truck-bolster whereby movement of the bolster relatively to the transom will actuate the adjusting-lever.

12. In an automatic-air-brake mechanism for railway cars, the combination with the car-truck, brake-cylinder, brake-beams, and mechanism connecting the brake-cylinder and brake-beams, of a bar connected with the truck-bolster, a lever fulcrumed on the truck-transom and connected with said bar, an adjusting-lever fulcrumed on the truck-frame, means operatively connecting said levers whereby movement of the bolster relatively to the transom will actuate the adjusting-lever, and means connecting the said adjusting-lever and brake-connecting mechanism, whereby movement of the adjusting-lever will vary the brake-piston travel necessary to apply the brakes.

In testimony whereof I have hereunto subscribed my name in the presence of two witnesses.

ALVA L. GOODKNIGHT.

Witnesses:
   D. O. BARNELL,
   ROY G. KRATZ.